United States Patent
Ikeda (10) Patent No.: US 9,831,036 B2
(45) Date of Patent: Nov. 28, 2017

(54) MULTILAYER CERAMIC CAPACITOR

(71) Applicant: Murata Manufacturing Co., Ltd., Nagaokakyo, Kyoto-fu (JP)

(72) Inventor: Mitsuru Ikeda, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 14 days.

(21) Appl. No.: 14/935,563

(22) Filed: Nov. 9, 2015

(65) Prior Publication Data
US 2016/0163453 A1   Jun. 9, 2016

(30) Foreign Application Priority Data
Dec. 4, 2014  (JP) .................. 2014-246070

(51) Int. Cl.
| | |
|---|---|
| *H01G 4/005* | (2006.01) |
| *H01G 4/228* | (2006.01) |
| *H01G 4/06* | (2006.01) |
| *H01G 4/30* | (2006.01) |
| *H01G 4/012* | (2006.01) |
| *H01G 4/12* | (2006.01) |
| H01G 2/12 | (2006.01) |
| H01G 4/232 | (2006.01) |

(52) U.S. Cl.
CPC .............. *H01G 4/012* (2013.01); *H01G 4/12* (2013.01); *H01G 4/30* (2013.01); *H01G 2/12* (2013.01); *H01G 4/232* (2013.01)

(58) Field of Classification Search
CPC .......... H01G 4/30; H01G 4/012; H01G 4/232; H01G 4/12

USPC ............. 361/321.1, 301.4, 303, 306.3, 321.2
See application file for complete search history.

(56) References Cited

U.S. PATENT DOCUMENTS

| | | | | |
|---|---|---|---|---|
| 8,971,017 | B1* | 3/2015 | Nakamura ............. | H01G 4/012 361/301.4 |
| 2009/0067117 | A1* | 3/2009 | Kasuya .................. | H01G 4/005 361/321.2 |

FOREIGN PATENT DOCUMENTS

JP   6-260023 A   9/1994

* cited by examiner

*Primary Examiner* — Eric Thomas
*Assistant Examiner* — Arun Ramaswamy
(74) *Attorney, Agent, or Firm* — Keating & Bennett, LLP (57) ABSTRACT

A ceramic body includes outer layer portions of about 15 μm or more and about 25 μm or less in thickness outside an inner layer portion where internal electrodes are stacked with dielectric ceramic layers interposed therebetween, the inner layer portion includes inner cover electrodes opposed to the internal electrode located outermost in the stacking direction with the dielectric ceramic layers interposed therebetween, the outer layer portions include outer cover electrodes opposed to the inner cover electrodes with the dielectric ceramic layers interposed therebetween, the inner cover electrodes have a coverage of about 75% or more and about 100% or less, the outer cover electrodes have a coverage of about 50% or more and about 70% or less, and boundary layers containing Mg and Mn are provided at the boundaries between the outer cover electrodes and the dielectric ceramic layers located outside the electrodes.

19 Claims, 4 Drawing Sheets

MULTILAYER CERAMIC CAPACITOR

BACKGROUND OF THE INVENTION

1. Field of the Invention

The present invention relates to a multilayer ceramic capacitor, and a multilayer ceramic capacitor including a ceramic body including a plurality of dielectric ceramic layers and a plurality of internal electrodes stacked with the dielectric ceramic layers interposed therebetween, and external electrodes provided on the ceramic body to be electrically connected to the internal electrodes.

2. Description of the Related Art

In recent years, with reductions in size and weight for electronic devices, small-size multilayer ceramic capacitors have been widely used and are capable of acquiring high capacitance. The multilayer ceramic capacitors are widely known to have a structure of, for example, a laminated body including a plurality of ceramic dielectric layers and a plurality of internal electrodes provided at the plurality of interfaces between the dielectric ceramic layers, with external electrodes provided on the outer surface of the laminated body to be electrically connected to the internal electrodes.

Figure 4:
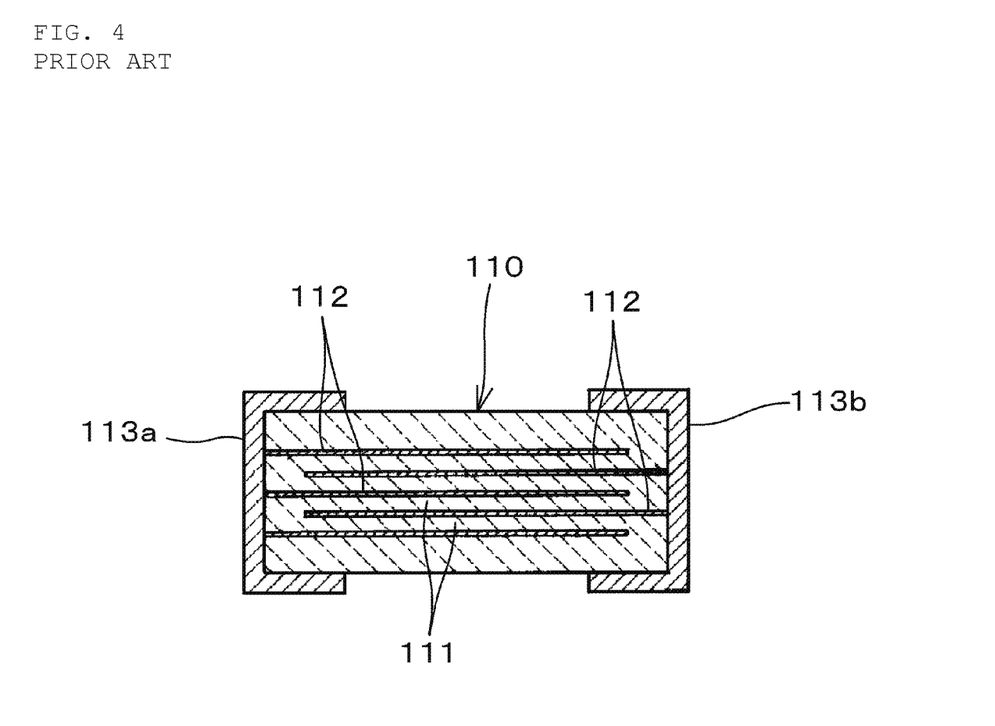
FIG. 4 is a cross-sectional view illustrating a conventional multilayer ceramic capacitor.

Further, as such a multilayer ceramic capacitor, a multilayer ceramic capacitor has been proposed which includes a ceramic body (capacitor main body) 110 including a plurality of dielectric ceramic layers (hereinafter, also referred to as "dielectric layers") 111 and a plurality of internal electrodes 112 provided at the plurality of interfaces between the dielectric layers 111, and a pair of external electrodes 113a, 113b provided on both end surfaces of the ceramic body 110 to be electrically connected to the internal electrodes 112 alternately extended to the opposite end surfaces, as shown in FIG. 4.

Further, in Japanese Patent Application Laid-Open No. 06-260023, as the dielectric layers, a composition of: 100 parts by mol of $BaTiO_3$; 1 to 7 parts by mol of $CaZrO_3$; 0.5 to 1.5 parts by mol of NiO; 0.1 to 0.3 parts by mol of MnO; and 0.2 to 0.7 parts by mol of $Re_2O_3$ is used for the dielectric layers, and small-size high-capacitance capacitors including the dielectric layers which undergo small changes in relative permittivity with temperature are supposed to be achieved.

However, in the case of the multilayer ceramic capacitor according to Japanese Patent Application Laid-Open No. 06-260023, which has the structure as described above, there is the problem of, for example, ingress of moisture passing through the outermost dielectric layers, into the ceramic body, thus degrading insulation resistance, or causing delamination.

SUMMARY OF THE INVENTION

Preferred embodiments of the present invention provide a highly reliable multilayer ceramic capacitor which is able to significantly reduce or prevent moisture ingress into a ceramic body, peeling between an inner layer portion and an outer layer portion, and the like.

A multilayer ceramic capacitor according to a preferred embodiment of the present invention includes a ceramic body including a plurality of dielectric ceramic layers and a plurality of internal electrodes alternately stacked in a stacking direction, and external electrodes provided on the ceramic body and connected to the plurality of internal electrodes, wherein the ceramic body includes an outer cover electrode and an inner cover electrode, the outer cover electrode is located outermost in the stacking direction among the plurality of internal electrodes, the inner cover electrode is located next to the outer cover electrode among the plurality of internal electrodes, the ceramic body includes an outer layer portion and an inner layer portion, the outer layer portion includes the outer cover electrode and a pair of dielectric ceramic layers interposing the outer cover electrode, the inner layer portion is adjacent to the outer layer portion and includes the inner cover electrode, a coverage of the inner cover electrode is greater than a coverage of the outer cover electrode, the coverage of the inner cover electrode is a proportion of the internal electrode covering the dielectric ceramic layer in a region between both ends of the inner cover electrode, the coverage of the outer cover electrode is a proportion of the internal electrode covering the dielectric ceramic layer in a region between both ends of the outer cover electrode, and the coverage of the inner cover electrode is greater than a coverage of one of the plurality of internal electrodes except for the inner cover electrode and the outer cover electrode.

The ceramic body can include a boundary layer containing Mg and Mn adjacent to the outer cover electrode and to the dielectric layer located outside the outer cover electrode.

The dielectric layer located outside the outer cover electrode can contain Mg and Mn.

The inner cover electrode can have a coverage of about 75% or more and about 100% or less, for example, and the coverage is a proportion of the internal electrode covering the dielectric ceramic layer in a region between both ends of the inner cover electrode. In addition, the outer cover electrode can have a coverage of about 50% or more and about 70% or less, the coverage is a proportion of the internal electrode covering the dielectric ceramic layer in a region between both ends of the outer cover electrode.

A dimension in the stacking direction of the outer layer portion can be about 15 μm or more and about 25 μm or less, for example.

The outer cover electrode can contain Ni.

The outer cover electrode can be connected to one of the external electrodes, and the inner cover electrode can be connected to the one of the external electrodes.

The external electrodes respectively can include a thick film electrode containing Cu on the ceramic body, a Ni plated layer on the thick film electrode, and a Sn plated layer on the Ni plated layer.

More specifically, according to various preferred embodiments of the present invention, the inner cover electrode which is high in coverage (continuity) (for example, about 75% or more and about 100% or less in continuity) makes it possible to prevent moisture ingress into the inner layer portion.

In addition, because the outer layer portion is provided with the outer cover electrode which is low in coverage (continuity) (for example, about 50% or more and about 70% or less in continuity), a large number of columnar portions are provided such that the ceramic constituting the dielectric ceramic layers passes (penetrates) through discontinuous portions (lost portions) of the outer cover electrode, and the columnar portions strongly couple the dielectric ceramic layers (dielectric layers) located outside and inside the outer cover electrode to each other to improve the adhesion between the outer layer portion and the inner layer portion.

It is to be noted that the coverage (continuity) of the inner cover electrode preferably is adjusted to about 75% or more and about 100% or less in the multilayer ceramic capacitor according to a preferred embodiment of the present invention, because the inner cover electrode of less than about 75% in coverage leads to an insufficient blocking effect against moisture penetrating the outer layer portion. On the other hand, the coverage of the inner cover electrode is preferably higher, and may be about 100%. However, it is not always easy to form the inner cover electrode in excess of about 95% in coverage, and thus typically, the coverage on the order of about 95% is sufficient.

In addition, the coverage of the outer cover electrode is preferably adjusted to about 50% or more and about 70% or less in the multilayer ceramic capacitor according to a preferred embodiment of the present invention, because the coverage of the outer cover electrode in this range sufficiently ensures discontinuous portions covered with no outer cover electrode in a region where the outer cover electrode is provided, thus making it possible to provide a large number of columnar portions provided such that the dielectric ceramic layer passes (penetrates) through the discontinuous portions of the outer cover electrode, and strongly couples the dielectric ceramic layers (dielectric layers) located inside and outside the outer cover electrode, thus making it possible to improve the adhesion between the outer layer portion and the inner layer portion.

In addition, in a multilayer ceramic capacitor according to a preferred embodiment of the present invention, the boundary layer containing Mg and Mn is provided at the boundary between the outer cover electrode and the dielectric ceramic layer located outside the outer cover electrode, and the boundary layer thus makes it possible to keep moisture passing through the outer layer portion from penetrating the inner layer portion, and makes it possible to improve the adhesion between the outer cover electrode and the dielectric ceramic layer located outside the outer cover electrode to keep moisture ingress from being caused from the boundary between the electrode and the layer.

Furthermore, in a multilayer ceramic capacitor according to a preferred embodiment of the present invention, the outer layer portion preferably is about 15 μm or more and about 25 μm or less in thickness, for example, and a highly reliable multilayer ceramic capacitor with a small size and necessary water resistance is thus provided without sacrificing electrostatic capacitance that can be acquired.

It is to be noted that the outer layer portion of less than about 15 μm in thickness makes moisture ingress through the outer layer portion more likely to be caused, and makes it difficult to sufficiently significantly reduce or prevent moisture ingress even when the inner cover electrode is provided which is high in coverage (continuity). Thus, the thickness of the outer layer portion is preferably about 15 μm or more, for example.

In addition, the outer layer portion in excess of about 25 μm in thickness increases the size of the multilayer ceramic capacitor, and necessary electrostatic capacitance cannot be acquired when the size is reduced within standards. Thus, the thickness of the outer layer portion is preferably about 25 μm or less, for example.

In addition, the outer cover electrode is preferably connected to the external electrode at the same potential as the internal electrodes adjacent to each other, or not connected to the external electrode, so as not to generate electrostatic capacitance between the outer cover electrode and the internal electrode adjacent to each other with the dielectric layer interposed therebetween.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of the present invention will be described below in more detail with reference to preferred embodiments of the present invention.

Figure 1:
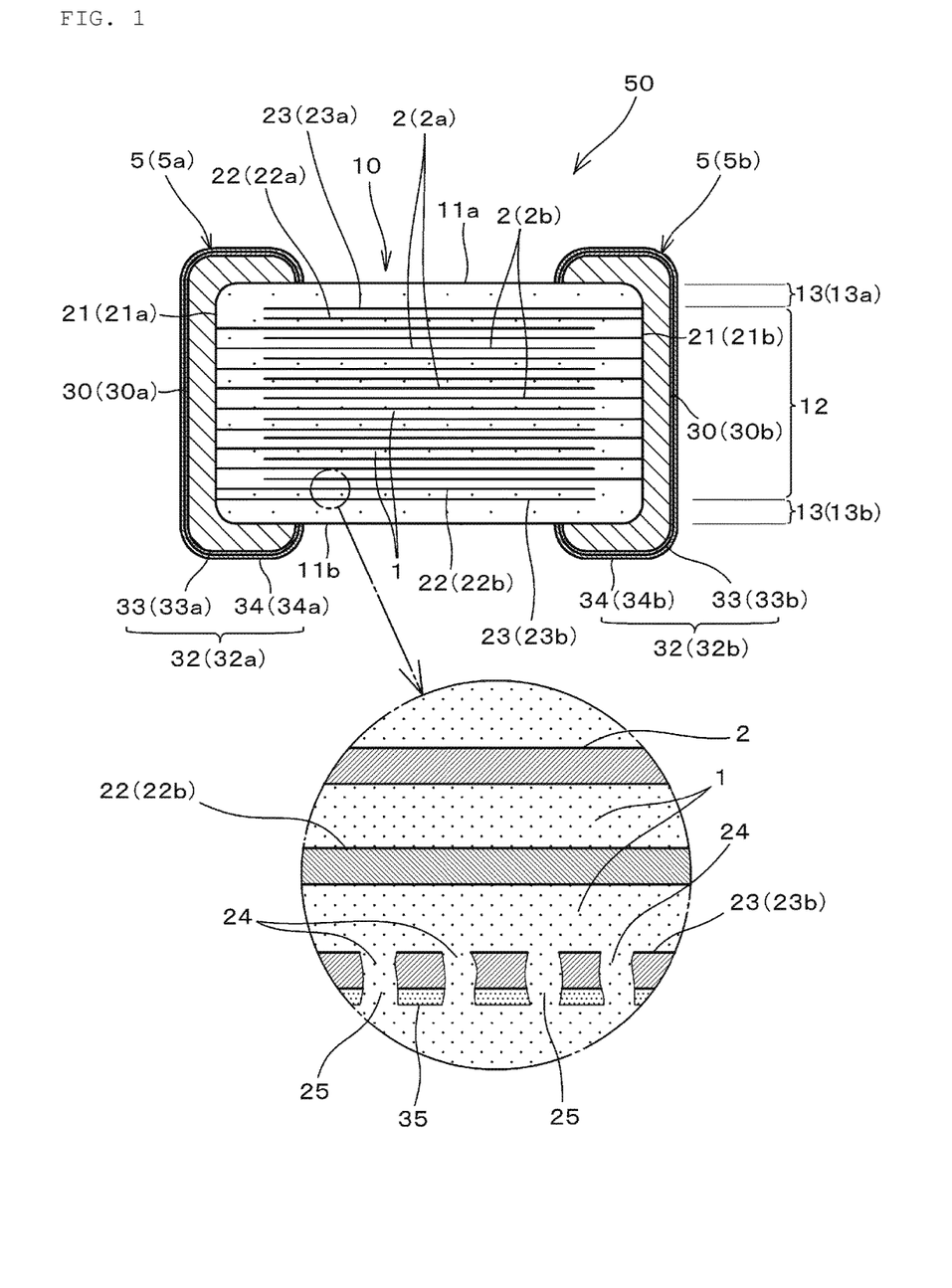
FIG. 1 is a front cross-sectional view illustrating the structure of a multilayer ceramic capacitor according to a preferred embodiment of the present invention.
Figure 2:
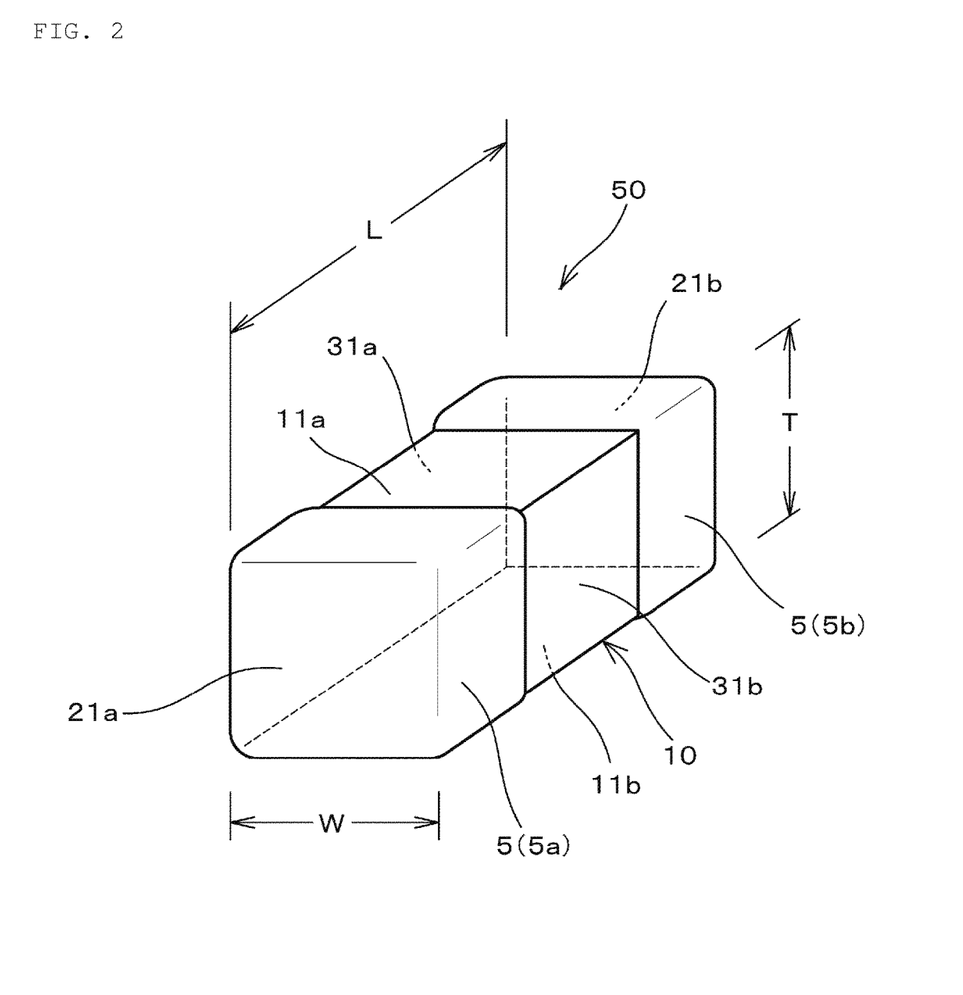
FIG. 2 is a perspective view illustrating the structure of a multilayer ceramic capacitor according to a preferred embodiment of the present invention.

FIG. 1 is a front cross-sectional view illustrating the structure of a multilayer ceramic capacitor 50 according to a preferred embodiment (Preferred Embodiment 1) of the present invention, and FIG. 2 is a perspective view illustrating the appearance configuration.

This multilayer ceramic capacitor 50 includes, as shown in FIGS. 1 and 2, a ceramic body (capacitor main body) 10 including a dielectric ceramic layers (hereinafter, also referred to as "dielectric layers") 1 and a plurality of internal electrodes 2 (2a, 2b) provided at the plurality of interfaces between the dielectric layers 1, and a pair of external electrodes 5 (5a, 5b) electrically connected to the internal electrodes 2 (2a, 2b) alternately extended to the opposite end surfaces of the ceramic body 10.

The ceramic body 10 preferably includes an inner layer portion 12 that is a region where the plurality of internal electrodes 2 (2a, 2b) is stacked with dielectric ceramic layers 1 interposed therebetween, and outer layer portions 13 (13a, 13b) of about 15 μm or more and about 25 μm or less in thickness, for example, which are regions without any internal electrode, located outside the inner layer portion 12 (on both upper and lower sides in FIG. 1) when viewed in the stacking direction of the internal electrodes 2 (2a, 2b).

A $BaTiO_3$ based ceramic material is preferably used as a dielectric ceramic material constituting the inner layer portion and the outer layer portions. In addition, the internal electrodes are preferably made of a metal containing Ni as its main constituent.

Further, the inner layer portion 12 includes inner cover electrodes 22 (22a, 22b) provided near the boundaries with the outer layer portions 13 (13a, 13b), and opposed to the internal electrodes 2 (2a, 2b) located outermost in the stacking direction with the dielectric layers 1 interposed therebetween.

Furthermore, the outer layer portions 13 (13a, 13b) include outer cover electrodes 23 (23a, 23b) provided near the boundaries with the inner layer portion 12, and opposed to the inner cover electrodes 22 (22a, 22b) with the dielectric layers 1 interposed therebetween.

In addition, this multilayer ceramic capacitor 50 has a structure and configuration such that the coverage (continuity) which is the proportion of the inner cover electrodes 22 (22a, 22b) covering the dielectric ceramic layers 1 is higher than those of the internal electrodes 2 (2a, 2b) and outer cover electrodes 23 (23a, 23b). Specifically, the coverage (continuity) of the inner cover electrodes 22 (22a, 22b) preferably is about 75% or more and about 100% or less, for example.

As just described, with the adjusted coverage (continuity) of the inner cover electrodes 22 (22a, 22b) from about 75% to about 100%, a structure is provided in which the dielectric layers 1 located outermost in the inner layer portion 12 are covered with the metal (inner cover electrodes 22 (22a, 22b)), and moisture penetrating the outer layer portions 13 is able to be blocked efficiently by the inner cover electrodes 22.

Moreover, the capacitor has a structure and configuration such that the coverage (continuity) which is the proportion of the outer cover electrodes 23 (23a, 23b) covering the dielectric ceramic layers 1 is lower than those of the internal electrodes 2 (2a, 2b) and the inner cover electrodes 22 (22a, 22b). Specifically, the coverage (continuity) of the outer cover electrodes 23 (23a, 23b) is about 50% or more and about 70% or less, for example.

The outer cover electrodes 23 (23a, 23b) are low in coverage (continuity) as described above, with a large number of discontinuous portions (lost portions) 24, and the dielectric ceramic penetrates into the discontinuous portions 24 so as to connect the dielectric layers 1 adjacent to each other with the outer cover electrodes 23 (23a, 23b) sandwiched therebetween, thus forming columnar portions 25. Then, the columnar portions 25 link the inner and outer dielectric layers 1 from the outer cover electrodes 23 (23a, 23b). As a result, a multilayer ceramic capacitor in which the inner layer portion 12 and the outer layer portions 13 are connected reliably is provided. It is to be noted that the columnar portions 25 contain Al. The Al contained in the columnar portions makes it possible to improve reliability at high temperature, at high humidity, or in a high electric field.

It is to be noted that the coverages (continuity) of the outer cover electrodes 23 in excess of about 70% will reduce the number of formed columnar portions 25 to weaken the adhesion between the inner layer portion 12 and the outer layer portions 13, thus increasing the possibility of peeling the outer layer portions 13. Further, the coverages (continuity) of the outer cover electrodes 23 are preferably about 50% or more, for example, due to the fact that the coverages (continuity) below about 50% make it difficult to increase the coverages (continuity) of the inner cover electrodes 22 to about 75% or more under the influence of firing.

Further, the outer cover electrodes 23 (23a, 23b) are connected to the external electrodes 5 (5a, 5b) at the same potential as the internal electrodes 2 (2a, 2b) adjacent to each other, so as not to generate electrostatic capacitance between the outer cover electrodes and the internal electrodes 2 (2a, 2b) of the inner layer portion 12 adjacent to each other with the dielectric layers 1 interposed therebetween. It is to be noted that it is also possible to configure the outer cover electrodes (23a, 23b) so as not to be connected to the external electrodes 5 (5a, 5b).

Further, boundary layers 35 containing Mg and Mn are provided at the boundaries between the outer cover electrodes 23 (23a, 23b) and the dielectric layers 1 (1a) located outside the electrodes.

The boundary layers 35 containing Mg and Mn keep moisture passing through the outer layer portions 13 from penetrating the inner layer portion 12.

It is to be noted that the boundary layers 35 are observed by FE-WDX.

From FIG. 1, it is determined that Mg is present at the boundary of the boundary layer 35 between the inner cover electrode 22 (22a, 22b) and the outer layer portions 13 (13a, 13b) located outside the electrode.

It is to be noted that in the present preferred embodiment, the molar ratio Mn/Mg of the Mn content to the Mg content in the boundary layers is not particularly limited, but preferably falls within the range of Mn/Mg=about 0.005 to about 0.7, for example. These contents are measured, for example, by the following method. First, 20 measurement points in positions on the order of ½ in the width direction (W direction) of the sample and on the order of ½ in the thickness direction of the boundary layer are randomly selected from the boundary layer. The boundary layer at each measurement point is processed into a thin piece, and the composition of the piece is then analyzed with an STEM. For the STEM, "JEM-2200FS" from JEOL Ltd. is used with an accelerating voltage adjusted to 200 kV. For a detector EDS, "JED-2300T" from JEOL Ltd. is used with the use of an SDD detector of 60 mm$^2$ in aperture, and "Noran System 7" from Thermo Fisher Scientific K.K. is used for an EDS system.

In addition, the thickness of the thin sample is adjusted to about 100 nm. The value of Mn/Mg is calculated for each measurement point to figure out the average for the values.

From FIG. 1, it is determined that the inner cover electrodes 22 (22a, 22b) are discontinuous, with a segregated product containing Si in the columnar portions 25.

In addition, the presence proportion (%) of the boundary layer is determined from the following formula (1) with the total length of the boundary layer with Mg and Mn present and the length of the outermost layer internal electrode excluding parts of the outermost layer internal electrode lost due to voids and segregation of Si.

Presence proportion (%) of boundary layer=(Total length of boundary layer with Mg and Mn present)/(Length of outermost layer internal electrode(excluding portions of the outermost layer internal electrode lost due to voids and segregation of Si))×100     (1)

However, the presence proportion of the boundary corresponds to an average for the values obtained at the 12 points mentioned above.

It is assumed that the boundary layers containing Mg and Mn are formed by, as a main factor, diffusion of a Mg constituent and a Mn constituent in the outermost dielectric layers into the outermost layer internal electrodes containing Ni as a conductive component in the present preferred embodiment. In this case, the molar ratio (Mg+Mn)/Ni of the total content of Mg and Mn to the Ni content in the boundary layer is not particularly limited, but preferably falls within the range of (Mg+Mn)/Ni=about 0.1 to about 0.8, for example. These contents are determined, for example, in the same way as in calculating the value of "Mn/Mg" as previously described.

Furthermore, in the case of the multilayer ceramic capacitor 50, the pair of external electrodes 5 (5a, 5b) provided on both ends of the ceramic body 10 is structured to include Cu sintered metal layers 30 (30a, 30b) as external electrode main bodies and plated layers 32 (32a, 32b).

The Cu sintered metal layers 30 (30a, 30b) as external electrode main bodies are baked electrodes (thick film electrodes) formed applying a conductive paste containing Cu as a conductive component to the ceramic body 10, and baking the paste. In addition, the Cu sintered metal layers 30 (30a, 30b), as shown in FIG. 2, wrap around the first end surface 21a and second end surface 21b of the ceramic body 10 to the first and second principal surfaces 11a, 11b and first and second side surfaces 31a, 31b of the ceramic body 10.

The plated layers 32 (32a, 32b) preferably completely cover the Cu sintered metal layers 30 (30a, 30b). In addition, in this preferred embodiment, the plated layers 32 (32a, 32b) are preferably plated layers that have two-layer structures including Ni plated layers 33 (33a, 33b) on the Cu sintered metal layers 30 (30a, 30b) and Sn plated layers 34 (34a, 34b) on the Ni plated layers 33 (33a, 33b).

Next, a non-limiting example of a method for manufacturing the multilayer ceramic capacitor will be described.

First, in order to obtain a dielectric ceramic raw material, respective powders of $BaCO_3$ and $TiO_2$ of 99 weight % or more in purity were blended at a ratio of Ba:Ti=1:1. Next, this blended powder was subjected to wet mixing in a ball mill, dispersed uniformly, and then subjected to drying treatment to obtain an adjusted powder.

Then, the adjusted powder obtained was subjected to calcination at 1000° C. to obtain a main constituent powder $BaTiO_3$ of 150 nm in average grain size.

On the other hand, respective powders of MgO, $Al_2O_3$, $V_2O_5$, $MnO_2$, $Dy_2O_3$, and $SiO_2$ were prepared as accessory constituents. Next, the respective powders of MgO, $Al_2O_3$, $V_2O_5$, $MnO_2$, $Dy_2O_3$, and $SiO_2$ were weighed so that the contents of Mg, Al, V, Mn, Dy, and Si with respect to 100 parts by mol of Ti were predetermined amounts (Mg: 1.3 parts by mol, Al: 0.5 parts by mol, V: 0.1 parts by mol, Mn: 0.1 parts by mol, Dy: 1.0 part by mol, Si: 1.5 parts by mol), and added to the main constituent powder to obtain a mixed powder.

Then, this mixed powder was subjected to wet mixing in a ball mill, dispersed uniformly, and then subjected to drying treatment to obtain a dielectric ceramic raw material.

Next, a polyvinyl butyral-based binder, a plasticizer, and ethanol as an organic solvent were added to the dielectric ceramic raw material prepared as described above, and these were subjected to wet mixing in a ball mill to prepare ceramic slurry. Then, this ceramic slurry was subjected to sheet forming by a lip method to obtain rectangular ceramic green sheets.

Furthermore, a Ni powder of 200 nm in average particle size was dispersed in an organic vehicle of ethyl cellulose dissolved in terpineol with the use of a three-roll mill to prepare a conductive paste for the formation of internal electrodes.

Then, the conductive paste containing Ni as a conductive component, prepared in the way described above, was applied by screen printing onto the ceramic green sheets to form conductive paste films (electrode patterns) to define internal electrodes, inner cover electrodes, and outer cover electrodes. Next, an unfired laminated body to define a ceramic body (capacitor main body) was obtained by stacking 300 layers of the ceramic green sheets with the electrode patterns formed so as to alternate the sides to which the electrode patterns for internal electrodes were extended, stacking, on both sides in the stacking direction, the ceramic green sheets with the conductive paste films (electrode patterns) formed to define inner cover electrodes and outer cover electrodes, and further stacking, on both sides in the stacking direction, the ceramic green sheets with no electrode patterns formed.

It is to be noted that the mesh spacing the screen for use in carrying out screen printing can be adjusted to make the coverage (continuity) which is the proportion of the inner cover electrodes covering the dielectric ceramic layers higher than those of the internal electrodes and outer cover electrodes, and to make the coverage (continuity) which is the proportion of the outer cover electrodes covering the dielectric ceramic layers lower than the internal electrodes and inner cover electrodes.

In addition, the coverage (continuity) can be also adjusted by regulating the firing condition for firing the unfired laminated body to define the ceramic body (capacitor main body) described above.

Then, the unfired laminated body was heated for 3 hours at a temperature of 350° C. in a $N_2$ atmosphere to burn the binder, and thereafter, at a rate of temperature increase of 100° C./min, and kept for 10 minutes at a top temperature of 1200° C. for firing in a reducing atmosphere composed of a $H_2$—$N_2$—$H_2O$ gas. Thus, a sintered ceramic body was obtained.

Next, a Cu paste containing glass frit was applied to both end surfaces of the ceramic body, and baked at 800° C. in a $N_2$ atmosphere to form Cu sintered metal layers electrically connected to the internal electrodes.

Thereafter, Ni plated layers were formed so as to cover the Cu external electrodes formed, and Sn plated layers were further formed so as to cover the Ni plated layers. It is to be noted that the Ni plated layers and the Sn plated layers were formed by electrolytic plating.

Thus, the multilayer ceramic capacitor 50 is obtained which has the structure as shown in FIGS. 1 and 2.

In this multilayer ceramic capacitor, the inner cover electrodes 22 (22a, 22b) which are high in coverage (continuity) prevent moisture ingress.

In addition, the boundary layers 35 containing Mg and Mn, which are located at the outer sides of the outer cover electrodes 23 (23a, 23b), significantly reduce moisture ingress into the inner layer portion 12.

In addition, because the outer cover electrodes 23 (23a, 23b) are low in coverage, the columnar portions 25 having a structure and configuration such that the ceramic constituting the dielectric layers 1 penetrates through the discontinuous portions (lost portions) 24 of the outer cover electrodes 23 (23a, 23b) link the inner and outer dielectric layers 1 from the outer cover electrodes 23 (23a, 23b), and improve the adhesion between the inner layer portion and the outer layer portions.

Furthermore, because the multilayer ceramic capacitor includes the outer layer portions preferably with a thickness of about 15 μm or more and about 25 μm or less, water resistance and impact resistance is improved in a small size without sacrificing electrostatic capacitance that can be acquired.

Accordingly, various preferred embodiments of the present invention make it possible to provide a highly reliable multilayer ceramic capacitor which is able to significantly reduce or prevent moisture ingress into a ceramic body, peeling between the inner layer portion and the outer layer portions, and the like, such as the multilayer ceramic capacitor according to the present preferred embodiment.

Evaluation Test

In order to confirm advantageous effects of various preferred embodiments of the present invention, samples (multilayer ceramic capacitors) of sample numbers 1 to 21 in Table 1 were prepared to perform a moisture resistance load test and a thermal test.

It is to be noted that among the samples of sample numbers 1 to 21 in Table 1, the samples of sample numbers marked with * (samples of sample numbers 1, 5, 9 to 15) refer to comparative samples that fail to meet the requirements of preferred embodiments of the present invention.

Specifically, sample number 1 refers to a sample in which the thickness of the outer layer portion fails to meet the requirements of preferred embodiments of the present invention, sample numbers 5 and 9 to 14 refer to samples in which the coverage of the outer cover electrode fails to meet the requirements of preferred embodiments of the present invention, and sample number 15 refers to a sample in which the coverage of the inner cover electrode fails to meet the requirements of preferred embodiments of the present invention.

The other samples meet the requirements of preferred embodiments of the present invention (samples according to examples of preferred embodiments of the present invention).

The method described below was used to check the coverages (continuity) of the outer cover electrode and inner cover electrode, and confirm the presence of the boundary layer.

First, each sample was wrapped around with a resin in a manner to expose the side surface (surface LT) ($31a$ or $31b$ in FIG. 2) surrounded in the length direction (direction L) (see FIG. 2) of the sample and the thickness direction (direction T) (see FIG. 2) thereof.

Then, the surface LT of each sample was polished with a polishing machine to a depth on the order of ½ in the width direction (direction W) (see FIG. 2) of each sample. Then, the polished surface was processed so as to eliminate shear drop of the internal electrodes due to the polishing.

Figure 3:
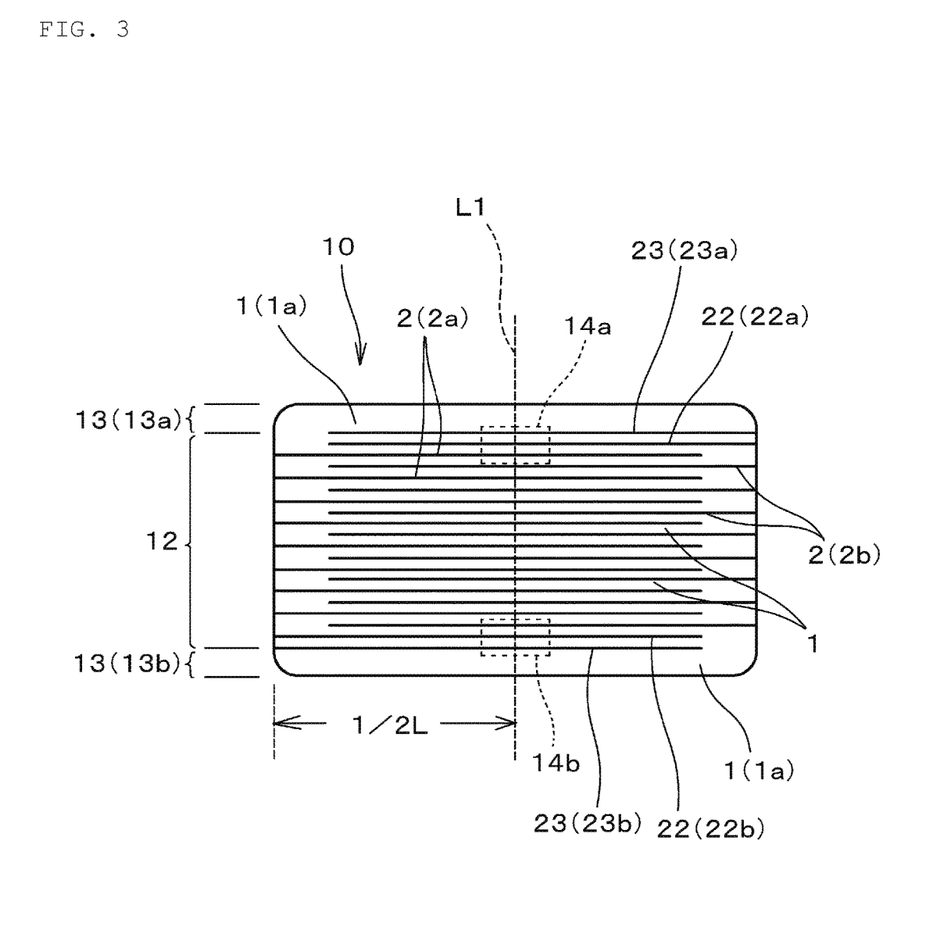
FIG. 3 is a diagram for explaining a method for checking continuity and boundary layers of electrodes of a multilayer ceramic capacitor according to a preferred embodiment of the present invention.

Next, as shown in FIG. 3, a line L1 orthogonal or substantially orthogonal to the internal electrodes is drawn (assumed) in a position on the order of ½ in the direction L of the polished surface LT of the sample.

Then, a scanning electron microscope was used to observe, at 10000-fold magnification, the boundary portions between the outer cover electrodes 23 ($23a$, $23b$) and the outer dielectric layers 1 ($1a$) therefrom, the inner cover electrodes 22 ($22a$, $22b$), the internal electrodes 2 ($2a$, $2b$) adjacent to the inner cover electrodes 22 ($22a$, $22b$) with the ceramic layers 1 interposed therebetween, and two upper and lower regions $14a$, $14b$ orthogonal to the line L1.

In this regard, the two upper and lower regions $14a$, $14b$ were observed for each of six samples.

Then, the boundary regions between the outer cover electrodes 23 ($23a$, $23b$) and the outer dielectric layers 1 ($1a$) therefrom were observed by FE-WDX to confirm the presence of Mg at the boundaries between the outer cover electrodes 23 ($23a$, $23b$) and the outer dielectric layers 1 ($1a$) therefrom, that is, the presence of the boundary layers containing Mg. In addition, the presence of Mn at the boundaries between the outer cover electrodes 23 ($23a$, $23b$) and the outer dielectric layers 1 ($1a$) therefrom was also confirmed in the same way.

In addition, the presence of a segregated product containing Si was confirmed in 39% or more of discontinuous regions (discontinuous portions (lost portions) as regions coated with no outer cover electrode) of the outer cover electrodes 23 ($23a$, $23b$). The presence of the segregated product containing Si in the lost portions makes it possible to further improve moisture resistance.

In this regard, the presence of the segregated product containing Si in 39% or more of the lost portions refers to the proportion of the number of lost portions with the segregated product containing Si to the total number of lost portions observed.

In addition, the coverages (continuity) (%) of the outer cover electrodes 23 ($23a$, $23b$), inner cover electrodes 22 ($22a$, $22b$), and internal electrodes 2 ($2a$, $2b$) were determined from the following formula with the total length of the lost portions of each electrode lost due to voids, segregation of Si, etc., and the width of the observed field of view (the length of the electrode in the absence of any lost portion).

Coverage(continuity) (%) of electrode={1−(Total length of lost portions of electrode lost due to voids, segregation of Si,etc.)/(Length of electrode=width of observed field of view)}× 100

It is to be noted that the coverages (continuity) of the outer cover electrodes, inner cover electrodes, and internal electrodes each correspond to an average for five values measured in the two upper and lower regions $14a$, $14b$.

(1) Moisture Resistance Load Test

For each sample of sample numbers 1 to 21, 1500 pieces were subjected to a moisture resistance load test under the conditions of 85° C., 85% RH, 4 V, and 100 h.

Then, after the test, the insulation resistance at room temperature was measured, and the piece with the insulation resistance down to 1 MΩ or less was determined to be defective. The sample without any defect generation found at all among the 1500 pieces was determined to be good (○), whereas the sample with just one defect generated was determined to be defective (×).

(2) Thermal Test

The thermal test is a test performed for confirming the generation of peeling in such a way that peeling between the inner layer portion and the outer layer portion is made obvious.

The thermal test was performed by immersing 50 pieces for each sample of sample numbers 1 to 21 in a solder bath heated to 325° C. for 3 minutes.

Then, the respective samples subjected to the test were wrapped around with a resin, and whether any crack was generated or not was then checked under a microscope while polishing. The sample without any defect generation found among the 50 pieces was determined to be good (○), whereas the sample with defect generation found for just one among the 50 pieces was determined to be defective (×).

Table 1 shows the results of the evaluations made in the way described above.

TABLE 1

| Sample Number | Coverage of Outer cover electrode | Coverage of Inner cover electrode | Thickness of Outer layer portion | Result of Moisture Resistance Load Test | Result of Thermal Test |
| --- | --- | --- | --- | --- | --- |
| 1* | 70% | 75% | 10 μm | x | ○ |
| 2 | 70% | 75% | 15 μm | ○ | ○ |
| 3 | 70% | 75% | 20 μm | ○ | ○ |
| 4 | 70% | 75% | 25 μm | ○ | ○ |
| 5* | 45% | 75% | 20 μm | x | ○ |
| 6 | 60% | 75% | 20 μm | ○ | ○ |
| 7 | 65% | 75% | 20 μm | ○ | ○ |
| 8 | 70% | 75% | 20 μm | ○ | ○ |
| 9* | 75% | 75% | 20 μm | ○ | x |
| 10* | 80% | 75% | 20 μm | ○ | x |
| 11* | 85% | 75% | 20 μm | ○ | x |
| 12* | 90% | 75% | 20 μm | ○ | x |
| 13* | 95% | 75% | 20 μm | ○ | x |
| 14* | 100% | 75% | 20 μm | ○ | x |
| 15* | 70% | 70% | 20 μm | x | ○ |
| 16 | 70% | 75% | 20 μm | ○ | ○ |
| 17 | 70% | 80% | 20 μm | ○ | ○ |
| 18 | 70% | 85% | 20 μm | ○ | ○ |
| 19 | 70% | 90% | 20 μm | ○ | ○ |
| 20 | 70% | 95% | 20 μm | ○ | ○ |
| 21 | 70% | 100% | 20 μm | ○ | ○ |

As shown in Table 1, it has been confirmed that the result of the moisture resistance load test is defective in the case of the sample of sample number 1 with the outer layer portions of about 10 µm in thickness below the range (about 15 µm to about 25 µm) according to a preferred embodiment of the present invention.

In addition, it has been confirmed that the result of the moisture resistance load test is defective in the case of the sample of sample number 5 with the outer cover electrode of about 45% in coverage below the range (about 50% to about 70%) according to a preferred embodiment of the present invention.

In addition, it has been confirmed that the result of the thermal test is defective in the case of the samples of sample numbers 9 to 14 with the outer cover electrodes of about 75% to about 100% in coverage in excess of the range (about 50% to about 70%) according to a preferred embodiment of the present invention.

In addition, it has been confirmed that the result of the moisture resistance load test is defective in the case of the sample of sample number 15 with the inner cover electrode of about 70% in coverage below the range (about 75% to about 100%) according to a preferred embodiment of the present invention.

In contrast, in the case of the samples of sample numbers 2 to 4, 6 to 8, and 16 to 21 which meet the requirements of preferred embodiments of the present invention, it has been confirmed that favorable results are achieved in both the moisture resistance load test and the thermal test.

From the results mentioned above, it is determined that preferred embodiments of the present invention achieve a highly reliable multilayer ceramic capacitor which is able to significantly reduce or prevent moisture ingress into a ceramic body, and capable of achieving favorable results in both the moisture resistance load test and the thermal test.

It is to be noted that the present invention is not limited to the preferred embodiments described above, but various applications and modifications can be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a ceramic body including a plurality of dielectric ceramic layers and a plurality of internal electrodes alternately stacked in a stacking direction; and
external electrodes provided on the ceramic body and connected to the plurality of internal electrodes; wherein
the ceramic body includes an outer cover electrode and an inner cover electrode, the outer cover electrode is located outermost in the stacking direction among the plurality of internal electrodes, the inner cover electrode is located next to the outer cover electrode among the plurality of internal electrodes;
the ceramic body includes an outer layer portion and an inner layer portion, the outer layer portion includes the outer cover electrode and a pair of dielectric ceramic layers interposing the outer cover electrode, the inner layer portion is adjacent to the outer layer portion and includes the inner cover electrode;
a dimension in the stacking direction of the outer layer portion is about 15 µm or more and about 25 µm or less;
the inner cover electrode has a coverage of about 75% or more and about 100% or less, the coverage of the inner cover electrode is a proportion of the internal electrode covering the dielectric ceramic layer in a region between both ends of the inner cover electrode;
the outer cover electrode has a coverage of about 50% or more and about 70% or less, the coverage of the outer cover electrode is a proportion of the internal electrode covering the dielectric ceramic layer in a region between both ends of the outer cover electrode;
the ceramic body includes a boundary layer containing Mg and Mn adjacent to the outer cover electrode and to the dielectric layer located outside the outer cover electrode; and
the coverage of the inner cover electrode is greater than a coverage of one of the plurality of internal electrodes except for the inner cover electrode and the outer cover electrode.

2. The multilayer ceramic capacitor according to claim 1, wherein the outer cover electrode contains Ni.

3. The multilayer ceramic capacitor according to claim 2, wherein the dielectric layer located outside the outer cover electrode contains Mg and Mn.

4. The multilayer ceramic capacitor according to claim 3, wherein
the outer cover electrode is connected to one of the external electrodes; and
the inner cover electrode is connected to the one of the external electrodes.

5. The multilayer ceramic capacitor according to claim 4, wherein each of the external electrodes includes a thick film electrode containing Cu on the ceramic body, a Ni plated layer on the thick film electrode, and a Sn plated layer on the Ni plated layer.

6. The multilayer ceramic capacitor according to claim 1, wherein a molar ratio of Mn/Mg in the boundary layer is about 0.005 to about 0.7.

7. The multilayer ceramic capacitor according to claim 1, wherein the boundary layer contains Ni and a molar ratio of Mg+Mn/Ni of a total content of Mg and Mn to a content of NI in the boundary layer is about 0.1 to about 0.8.

8. The multilayer ceramic capacitor according to claim 1, wherein each of the external electrodes includes at least one of a sintered layer and a plated layer.

9. A multilayer ceramic capacitor comprising:
a ceramic body including a plurality of dielectric ceramic layers and a plurality of internal electrodes alternately stacked in a stacking direction; and
external electrodes provided on the ceramic body and connected to the plurality of internal electrodes; wherein
the ceramic body includes an outer cover electrode and an inner cover electrode, the outer cover electrode is located outermost in the stacking direction among the plurality of internal electrodes, the inner cover electrode is located next to the outer cover electrode among the plurality of internal electrodes;
the ceramic body includes an outer layer portion and an inner layer portion, the outer layer portion includes the outer cover electrode and a pair of dielectric ceramic layers interposing the outer cover electrode, the inner layer portion is adjacent to the outer layer portion and includes the inner cover electrode;
a coverage of the inner cover electrode is greater than a coverage of the outer cover electrode, the coverage of the inner cover electrode is a proportion of the internal electrode covering the dielectric ceramic layer in a region between both ends of the inner cover electrode, the coverage of the outer cover electrode is a proportion of the internal electrode covering the dielectric ceramic layer in a region between both ends of the outer cover electrode; and the coverage of the inner cover electrode is greater than a coverage of one of the plurality of internal electrodes except for the inner cover electrode and the outer cover electrode.

10. The multilayer ceramic capacitor according to claim 9, wherein the ceramic body includes a boundary layer containing Mg and Mn adjacent to the outer cover electrode and to the dielectric layer located outside the outer cover electrode.

11. The multilayer ceramic capacitor according to claim 10, wherein the dielectric layer located outside the outer cover electrode contains Mg and Mn.

12. The multilayer ceramic capacitor according to claim 9, wherein the inner cover electrode has a coverage of about 75% or more and about 100% or less, the coverage of the inner cover electrode is a proportion of the internal electrode covering the dielectric ceramic layer in a region between both ends of the inner cover electrode; and the outer cover electrode has a coverage of about 50% or more and about 70% or less, the coverage of the outer coverage electrode is a proportion of the internal electrode covering the dielectric ceramic layer in a region between both ends of the outer cover electrode.

13. The multilayer ceramic capacitor according to claim 9, wherein a dimension in the stacking direction of the outer layer portion is about 15 μm or more and about 25 μm or less.

14. The multilayer ceramic capacitor according to claim 9, wherein the outer cover electrode contains Ni.

15. The multilayer ceramic capacitor according to claim 14, wherein the outer cover electrode is connected to one of the external electrodes; and the inner cover electrode is connected to the one of the external electrodes.

16. The multilayer ceramic capacitor according to claim 15, wherein each of the external electrodes includes a thick film electrode containing Cu on the ceramic body, a Ni plated layer on the thick film electrode, and a Sn plated layer on the Ni plated layer.

17. The multilayer ceramic capacitor according to claim 9, wherein a molar ratio of Mn/Mg in the boundary layer is about 0.005 to about 0.7.

18. The multilayer ceramic capacitor according to claim 9, wherein the boundary layer contains Ni and a molar ratio of Mg+Mn/Ni of a total content of Mg and Mn to a content of NI in the boundary layer is about 0.1 to about 0.8.

19. The multilayer ceramic capacitor according to claim 9, wherein each of the external electrodes includes at least one of a sintered layer and a plated layer.

\* \* \* \* \*